Oct. 26, 1965  J. C. DANKO ETAL  3,214,295
THERMOELECTRIC NUCLEAR FUEL ELEMENTS
Filed Nov. 1, 1962  4 Sheets-Sheet 2
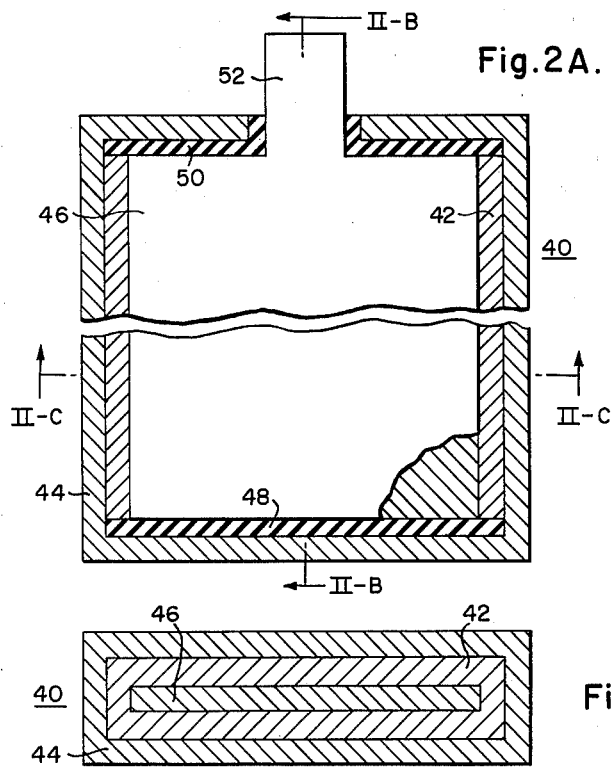
Fig. 2A.
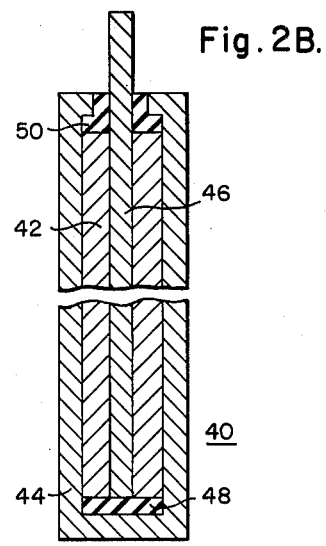
Fig. 2B.
Fig. 2C.
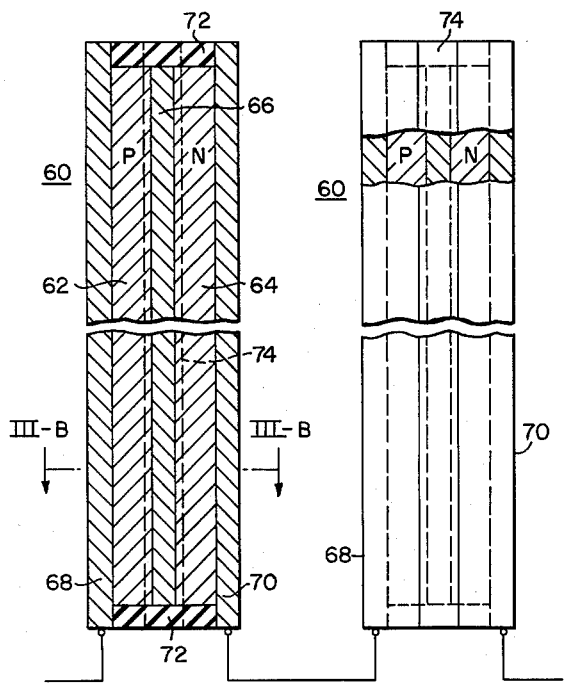
Fig. 3A.
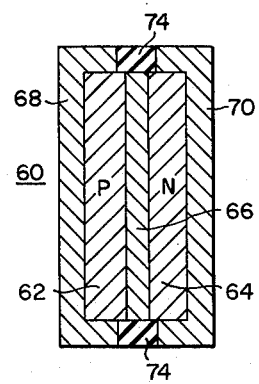
Fig. 3B.

Oct. 26, 1965  J. C. DANKO ETAL  3,214,295
THERMOELECTRIC NUCLEAR FUEL ELEMENTS
Filed Nov. 1, 1962  4 Sheets-Sheet 3

United States Patent Office 3,214,295
Patented Oct. 26, 1965

3,214,295
THERMOELECTRIC NUCLEAR FUEL ELEMENTS
Joseph C. Danko, King of Prussia, and Stephen N. Tower, Murrysville, Pa., and Garland L. Thomas, Springfield, Mo., assignors to Westinghouse Electric Corporation, East Pittsburgh, Pa., a corporation of Pennsylvania
Filed Nov. 1, 1962, Ser. No. 234,795
6 Claims. (Cl. 136—4)

The present invention relates to thermoelectric nuclear fuel elements and more particularly to such elements which include material having both fissile and thermoelectric generating properties.

With development of thermoelectric fissile materials for use in converting energy directly from heat to electricity, it is necessary to embody such material or materials structurally in efficient fuel elements for employment in the reactive region or core of a nuclear reactor both for the purpose of establishing a chain fission reaction or breeding fissionable material from such a reaction and for the purpose of generating thermoelectric power. For specific information related to the constituents and properties of thermoelectric fissile materials, reference is made to Serial No. 234,794, filed by J. C. Danko on November 1, 1962, now abandoned, entitled "Thermoelectric Nuclear Fuel Elements" and assigned to the present assignee. For the purpose of obtaining a better understanding of the present invention, it is worth noting here generally that thermoelectric fissile material can be provided either as n or p semiconductive type in the form of off-stoichiometric uranium dioxide or in the form of one or more oxides of a fissile isotope such as U–235, U–238, Pu–239 or Pu–241 doped with a monovalent metallic element having a valence state different from the normal valence state of the isotope(s) in the oxide(s).

The released fission heat energy of a chain nuclear reaction, propagated in a nuclear reactor in accordance with well known or published theory, provides a convenient energy source for a thermoelectric generator formed from series connected thermoelectric elements if suitable provision is made for respectively heating and cooling alternate thermoelectric junctions. The thermoelectric elements or bodies can be non-fissionable but thermoelectric in character or they can be both fissionable and thermoelectric in character, and in either event a high temperature gradient is provided across the thermoelectric bodies for the thermoelectric generation of power over a relatively long period of time with the maximum temperature obtainable in the reactor being limited only by the strength of structural materials. Structural information on examples of thermoelectric nuclear fuel elements comprising separate fissile or fissionable and thermoelectric portions connected in good heat transfer relationship as well as nuclear core configurations and arrangements for supporting thermoelectric fuel elements in a core and withdrawing energy therefrom can be obtained by reference to U.S. Patent 3,005,766 issued to S. Bartnoff on October 24, 1961, entitled "Thermoelectric Systems" and assigned to the present assignee and U.S. Patent 3,008,890 issued to S. Bartnoff on November 14, 1961, entitled "Thermoelectric Systems" also assigned to the present assignee.

In accordance with the broad principles of the present invention, a thermoelectric nuclear fuel element comprises at least one thermoelectric portion disposed within cladding means including metallic cladding material which is in good thermal relation to the thermoelectric portion so as to form a cold thermoelectric circuit junction therefor. If only one thermoelectric portion is provided in the fuel element, then such portion is also characterized as being fissile or fissionable. If more than one thermoelectric portion is provided in the fuel element, the thermoelectric portions are of alternating semiconductive types in series circuit relation and at least one of the portions can have both thermoelectric and fissile properties whereas the other or others can be characterized with only thermoelectric generating properties or with both fissile and thermoelectric properties. The hot junction for each thermoelectric portion is formed by a metallic member connected thereto and the next adjacent thermoelectric portion if more than one thermoelectric portion is provided. Otherwise, the hot metallic member is extended to the exterior in electrically insulative relation through outer cladding means. Such cladding means include, as at least a part thereof, the previously mentioned metallic cladding material, and the cladding means along with the thermoelectric portion or portions can be so formed as to provide a plate, rod or tube type fuel element.

It is therefore an object of the invention to provide a novel and efficient nuclear fuel element having cladding means providing a cold thermoelectric junction for at least one thermoelectric fissile body disposed therein for production of both nuclear and thermoelectric energy.

Another object of the invention is to provide a novel and efficient nuclear fuel element as characterized in the first object wherein the fuel element is provided with plate or rod type structure.

A further object of the invention is to provide a novel and efficient nuclear fuel element as characterized in the first object, wherein at least a pair of thermoelectric fissile bodies of opposed semiconductive types are provided within the cladding means with a hot thermoelectric circuit junction formed therebetween.

An additional object of the invention is to provide a novel and efficient nuclear fuel element as characterized in the preceding object, wherein the fuel element is provided with plate, rod or tubular structure.

It is another object of the invention to provide a novel and efficient nuclear fuel element having cladding means and a plurality of thermoelectric fissile bodies of opposed semiconductive types in series alternating relation with successive cold and hot thermoelectric circuit junctions therebetween for production of both nuclear and thermoelectric energy.

It is an additional object of the invention to provide a novel and efficient nuclear fuel element having cladding means and a plurality of thermoelectric bodies of opposed semiconductive types in series circuit relation with successive cold and hot thermoelectric junctions formed therebetween and with at least one of the thermoelectric bodies also being fissionable for the production of nuclear and thermoelectric energy.

A further object of the invention is to provide a novel and efficient nuclear fuel element as characterized in the preceding object wherein the cladding means are so formed as especially to adapt the fuel element for use with a gaseous coolant.

These and other objects of the invention will become more apparent upon consideration of the following detailed description along with the attached drawing, in which:

FIGS. 2A–2C show a thermoelectric nuclear fuel element similar to the fuel element shown in FIG. 1, but provided in this case in plate form;

Figure 5:
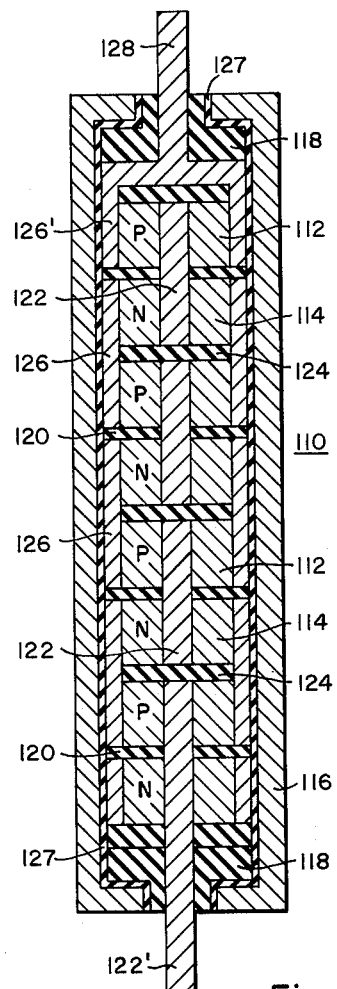
Figure 6:
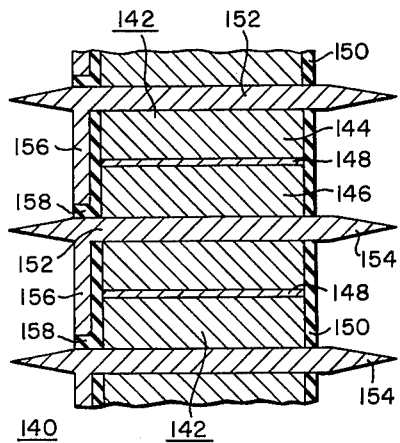
Figure 9:
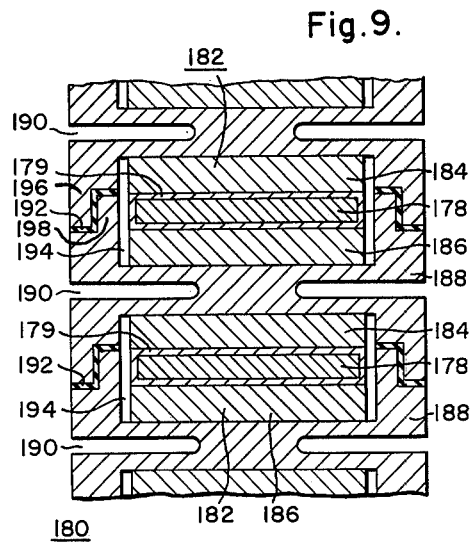
Figure 8:
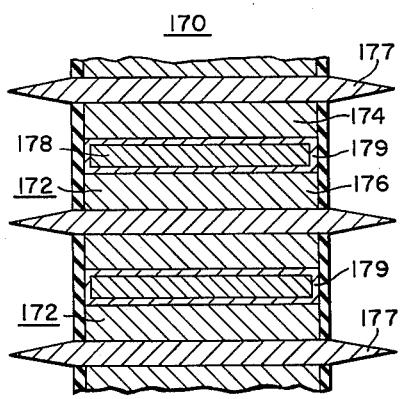
Figure 7:
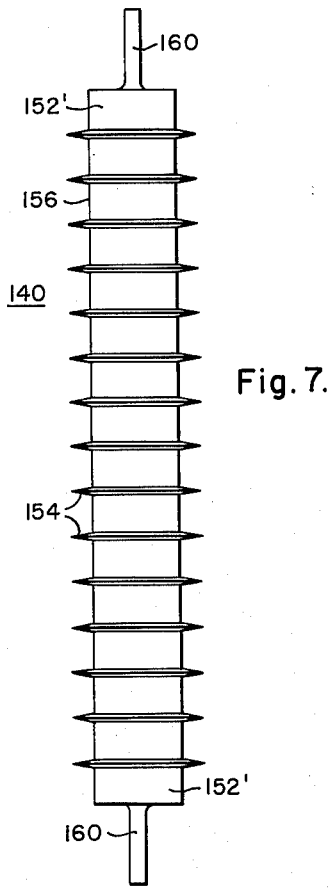

FIGS. 3A–B and 4A–B show respectively plate and tube type forms of another thermoelectric nuclear fuel element constructed in accordance with the principles of the invention;

FIG. 5 shows a so-called series type thermoelectric nuclear fuel element constructed in accordance with the principles of the invention;

FIG. 6 shows another embodiment of the invention in the form of a series type thermoelectric nuclear fuel element especially adapated for use with a gaseous coolant in a nuclear reactor;

FIG. 7 shows the manner in which gaseous coolant is employed with the fuel element of FIG. 6 or the fuel elements of FIGS. 8 and 9; and FIGS. 8 and 9 show respective modifications of the thermoelectric nuclear fuel element shown in FIG. 6.

Figure 1:
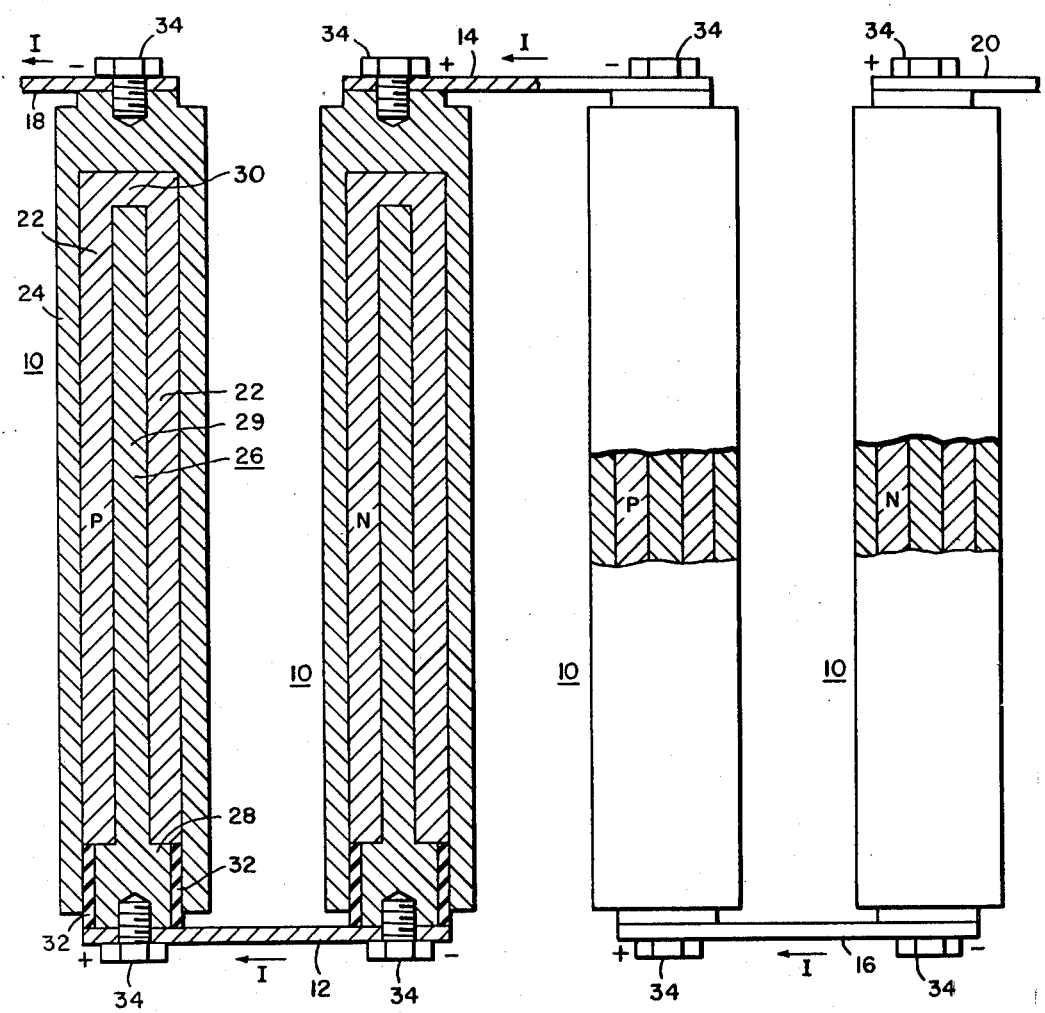
FIGURE 1 shows a plurality of thermoelectric nuclear fuel elements formed in accordance with principles of the invention and interconnected for use in the reactive region of a nuclear reactor.

There are shown in FIG. 1 a plurality of elongated thermoelectric nuclear fuel elements 10 formed in accordance with the principles of the invention. The fuel elements 10 are interconnected in electrical series through the use of respective conductive straps 12, 14 and 16, and additional conductive straps 18 and 20 are employed for connecting the fuel elements 10 to an electrical output or with any additional desired number of other thermoelectric nuclear fuel elements (not shown).

The thermoelectric nuclear fuel element 10 includes a mass or tubular body 22 of thermoelectric fissile material having suitable constituents such as those previously described. By "fissile" it is meant that the material is either fertile or fissionable and by "fertile" it is meant that the material is susceptible to transformation into a fissionable material. The body 22 when combined with the fissile mass or thermoelectric fissile mass of other fuel elements in the reactive region or core of a nuclear reactor is sufficient to sustain a chain nuclear reaction. As alreadly noted, the theory of a chain nuclear reaction is now well understood or readily available in published material and will therefore not be investigated here.

The manner in which nuclear fuel elements are structurally disposed in a reactor and the manner in which circuit connections are established when the fuel elements also have the property of thermoelectric power generation will not be described to any substantial extent here. If desired, a more thorough description of the same can be obtained by reference to earlier published material such as the previously noted Bartnoff patents.

The thermoelectric fuel element 10 is in this case elongated and circular in cross section to be characterized as a rod type element, but other geometric forms to be described subsequently can be provided for a fuel element in accordance with the principles of the invention. The thermoelectric fissile body 22 is accordingly elongated in the form of a hollow cylinder which is closed at one end 30 thereof. If desired, the closed end portion 30 can be removed and replaced by an electrically and thermally insulative disc (not shown). In order to provide structural stability and corrosion protection against exterior longitudinally directed reactor coolant flow, cladding means including a cladding member 24 covers or circumscribes the thermoelectric fissile body 22. The cladding member 24 also serves as an electrically conductive terminal for forming a cold junction between the element 10 and the next adjacent thermoelectric nuclear fuel element.

In addition, a conductive core member 26 provides an end plug 28 for sealing the thermoelectric fissile body 22 within the cladding member 24, and it also provides an elongated leg 29 inserted within the fissile body 22 for use as a terminal and forming a hot junction between the element 10 and the next adjacent thermoelectric nuclear fuel element. An electrically insulative layer 32 is provided circumferentially about the core plug 28 for the purpose of insulating the core member (terminal) 26 from the cladding member (terminal) 24. Securacte of the strips 12-20 to the thermoelectric nuclear fuel elements 10 is accomplished through the use of conductive bolts 34 which can be suitably staked or otherwise permanently secured in place if desired.

The material employed for the cladding and core members 24 and 26 preferably has mechanical properties which provide fuel element strength and structural stability, a relatively low neutron absorption cross section for neutron economy, and electrical conductivity to provide for delivery of thermoelectric power. In addition, this material preferably has certain chemical and metallurgical properties including resistance against reactor coolant corrosion and bondability (as by compaction or swaging) to the thermoelectric fissile body 22 in relatively low electrical resistance relation. An example of such a material is iron jacketed with stainless steel.

The insulative material employed in forming the layer 32 preferably provides substantial electrical impedance against current flow between the members 24 and 26 and further has a relatively low neutron absorption cross section and is readily bondable (as by swaging) in good mechanical relation with the material of the members 24 and 26. If some of the insulative material is exposed to the reactor coolant, as in FIG. 1, then it preferably is also resistant to corrosion. An example of an insulative material acceptable in a great many applications is silica.

In this case, successive thermoelectric fuel elements 10 are formed from dissimilar semiconductive types of thermoelectric material. For example, if the thermoelectric nuclear fuel element 10 to the far left of FIG. 1 is provided as p-type then the next element 10 of the series is n-type followed by a p-type element 10 and finally an n-type element 10. As previously noted the conductive straps 12 and 16 form hot junctions between thermoelectric fissile bodies 22 which are dissimilar in semiconductive type. A hot junction is formed in the sense that the strap 12 or 16 serves as an electrical conductor between the electrically associated core legs 29 which operate at a high temperature. Similarly, the conductive straps 14, 18 and 20 provide cold junctions between bodies 22 of dissimilar semiconductive types of thermoelectric fissile material in the sense that they serve as electrical conductors between associated cladding members 24 which are retained at a relatively low temperature by the adjacent flowing reactor coolant.

An electrical series generating circuit is thus provided. For example, electron current I flows from the thermoelectric fissile body 22 in the fuel element 10 to the far right of FIG. 1 through the conductive strap 16 and the next adjacent fuel element 10, through the conductive strap 14 and the next fuel element 10, and finally through the conductive strap 12 and the far left fuel element 10 to the conductive strap 18.

It is noted that in conventional thermoelectric generators heating usually is relatively localized at a hot junction of the thermoelectric mass and cooling is relatively localized at a cold junction of the thermoelectric mass. In this case, cooling is relatively localized for it occurs over the outer exposed surface of the cladding member 24, but heat generation occurs substantially homogeneously throughout the volume of the thermoelectric fissile body 22 and not locally at the hot thermoelectric junction formed in part by the core leg 29. Notwithstanding this fact, substantial thermal gradient occurs across the thermoelectric fissile body 22 to provide a basis for thermoelectric power generation. In fact, the hot junction is advantageously disposed adjacent the hottest portion of the thermal gradient, which portion normally exists at the central axis of a nuclear fuel element. Thus, a relatively greater temperature differential is provided between the hot and cold junctions of the thermoelectric series.

In FIGS. 2A-2C there is shown another elongated thermonuclear fuel element 40 similar to the fuel element 10 but provided as a plate type element. Thus, a hollow plate type thermoelectric fissile body 42 of given semiconductive type is disposed within cladding means or a hollow elongated plate type cladding member 44 and is suitably bonded thereto in good electrical relation. Additionally, a plate type conductor 46 is suitably bonded to the thermoelectric fissile body 42 in the hollow therein. A layer 48 of thermally and electrically insulative material is disposed between one end of the thermoelectric fissile body 42 and the adjacent end of the cladding member 44. Similarly, a layer 50 of thermally and electrically insulative material is disposed between the other thermoelectric fissile body end and the other cladding member end, with a terminal lug 52 of the plate conductor 46 extending therethrough to the exterior. The plate conductor 46 forms a hot thermoelectric circuit junction for the fuel element 40 and the cladding member 44 forms a cold thermoelectric circuit junction therefor, and a plurality of the fuel elements 40 can be interconnected to generate thermoelectric power in a nuclear reactor in a manner similar to that described for the fuel element 10 of FIG. 1.

In FIGS. 3A–3B, 4A–4B there are shown respective plate and tube type embodiments of the invention, in which a pair of opposite semiconductive type thermoelectric bodies are included in a single fuel element. At least one of the thermoelectric bodies is fissile as well as thermoelectric, and the other thermoelectric body of the pair is preferably thermoelectric only. In this manner, the average thermoelectric generating efficiency can be improved if the thermoelectric generating efficiency of the selected thermoelectric fissile material is undesirably low.

Accordingly, in FIGS. 3A and 3B there is shown an elongated plate type thermoelectric nuclear fuel element 60 having a pair of plate type thermoelectric bodies 62 and 64 connected in electrical series through a conductive plate 66 which forms a hot thermoelectric circuit junction therebetween. At least one of the thermoelectric bodies 62 and 64 (such as the thermoelectric body 62) is also fissile. The thermoelectric bodies 62 and 64 are clad from the exterior by cladding means including respective electrically conductive metallic cladding members 68 and 70 of U-shaped cross section. The cladding members 68 and 70 also serve as respective cold thermoelectric circuit junctions for the thermoelectric bodies 62 and 64.

Respective thermally and electrically insulative plates 72 are bonded to the cladding members 68 and 70 to clad each end of the fuel element 60, and a similarly insulative strip 74 extends along the length of the fuel element 60 in bonded relation to the cladding members 68 and 70 as well as the insulative plates 72 to complete the fuel element cladding means while simultaneously electrically insulating the cladding members 68 and 70 from each other. Each fuel element 60 therefore provides a series thermoelectric generating circuit through the cold junction 70, the thermoelectric body 64, the hot junction 66, the thermoelectric fissile body 62 and finally the cold junction 68. A plurality of the fuel elements 60 can be interconnected in series circuit relation as shown to obtain a series additive thermoelectric voltage output.

Figure 4A:
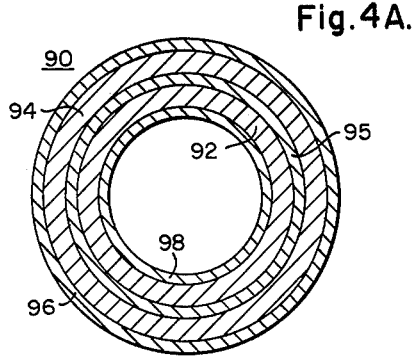
Figure 4B:
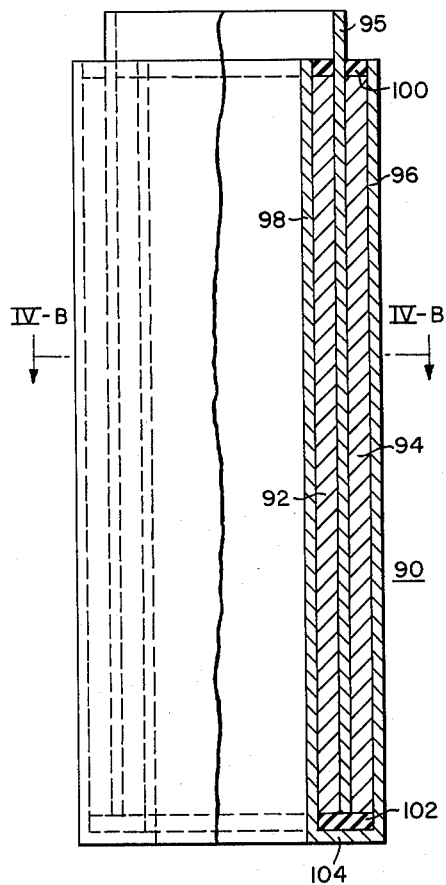

There is shown in FIGS. 4A and 4B an elongated tubular type thermoelectric nuclear fuel element 90 having a pair of concentric hollow cylindrical thermoelectric bodies 92 and 94 connected in electrical series through a conductive metallic tubular member 95 which forms a hot thermoelectric circuit junction therebetween. At least the thermoelectric body 94 is also fissile. Cladding means provided for the thermoelectric bodies 92 and 94 include an outer tubular metallic cladding member 96 and an inner tubular metallic cladding member 98 which are bonded in good electrical and thermal relation with the thermoelectric bodies 94 and 92 respectively. In addition, annular electrically and thermally insulative rings 100 and 102 are employed to clad each end of the space between the tubular cladding members 96 and 98.

If it is desired to connect the thermoelectric bodies 92 and 94 in electrical parallel, an annular end ring portion 104 can be extended between the cladding members 96 and 98 adjacent one end thereof and over the insulative ring 102, and the cladding members 96 and 98 can then serve as electrically common cold junctions for the thermoelectric bodies 92 and 94 respectively. The tubular conductor 95 can then be extended outwardly of the fuel element 90 through the annular ring or rings 100 to serve as a common hot junction for the thermoelectric bodies 92 and 94. On the other hand, the thermoelectric bodies 92 and 94 can be connected in thermoelectric series, in which case the tubular conductor 95 can be terminated (not shown) inwardly of the annular ring 100 and the end metallic ring 104 is omitted. In either case, the thermoelectric nuclear fuel element 90 can be connected in electrical series with other fuel elements in a manner similar to that described for the fuel element 10 of FIG. 1.

Another thermoelectric nuclear fuel element 110 is shown in FIG. 5 and it includes a plurality of opposed semiconductive type tubular thermoelectric segments 112 and 114 disposed within cladding means including a tubular metallic cladding member 116. Thermally and electrically insulative end plugs 118 are employed to seal the ends of the cladding member 116. Depending upon nuclear fuel requirements of the reactor in which the fuel element 110 is to be employed, either one or both of the groups of segments 112 and 114 are endowed with fissile as well as with thermoelectric properties.

The thermoelectric boides 112 and 114 of successive pairs of bodies 112 and 114 are separated by an electrically and thermally insulative disk 120 but are electrically connected by means of a rod conductor 122 which is concentrically disposed therein in good conductive relation to form a hot thermoelectric circuit junction therefor. The rod conductors 122 and the adjacent thermoelectric bodies 112 or 114 are further insulatively spaced from the next longitudinally adjacent conductive rod 122 and thermoelectric body 112 or 114 by means of another insulative disc 124.

A cold series thermoelectric circuit junction is then established between those thermoelectric bodies 112 and 114 divided by the insulative discs 124 by means of respective outer tubular conductors or rings 126. An electrically insulative layer 127 having good thermal conductivity is disposed between the tubular conductors 126 and the outer cladding member 116 so as to establish good cooling for the tubular conductors 126 yet so as to insulate the latter electrically from the outer cladding member 116. An end rod conductor 122' is extended to the exterior through the adjacent insulative end plug 118 to provide a hot thermoelectric junction connection with an adjacent fuel element 110. Similarly, an end tubular conductor 126' is provided with an end portion 128 which extends to the exterior through the adjacent insulative end plug 118 to provide a cold thermoelectric junction for connection to an adjacent fuel element 110.

A series thermoelectric generating circuit is thus provided through the fuel element 110, that is electron current is generated so as to flow from the thermoelectric body 114 at the bottom of FIG. 5 through the rod conductor 122' to the thermoelectric body 112 connected thereto, then through the outer tubular conductor 126 into the next tubular thermoelectric body 114 and so forth to the end terminal portion 128. Circuit connections among the fuel elements 110 can, of course, be established in a manner similar to that already described for previous embodiments of the invention.

Embodiments of the invention especially adapted for use with a gaseous coolant are shown in FIGS. 6–9. Thus, in FIGS. 6 and 7 there is shown a thermoelectric nuclear fuel element 140 formed from a plurality of series connected disc-like thermoelectric components 142. Each thermoelectric component 142 comprises a thermoelectric body 144 of one semiconductive type and a thermoelectric body 146 of the opposite semiconductive type electrically connected by a bonded metallic disc 148 forms a hot thermoelectric circuit junction therebetween. As mentioned previously in connection with FIG. 5, either one or both of the groups of thermoelectric bodies 144 and 146 also have fissile properties.

Each thermoelectric component 142 is further disposed within cladding means including a tubular thermally and electrically insulative cladding member 150 which is bonded thereto and a plurality of these combinations are then stacked in alternating relation with metallic disc-like conductors 152 having laterally extending circumferential fins 154 thereon, which serve as heat dissipating means. The metallic conductors 152 thus serve as respective cold thermoelectric circuit junctions in connecting the thermoelectric bodies 144 and 146 of adjacent thermoelectric components 142.

The fins 154, as aforesaid, provide substantial surface area for cooling purposes, and if desired additional surface cooling area can be provided by extending a portion 156 longitudinally outwardly from each fin 154 either partially or entirely around the circumference of the fuel element 140. If the portions 156 are employed, then an electrically and thermally insulative spacer 158 can be employed to divide the cooling portion 156 from the next longitudinally adjacent conductor 152.

The fact that very substantial surface cooling area is provided for the thermoelectric nuclear fuel element 140 especially adapts the latter for use with a gaseous coolant in a gas cooled reactor. The manner in which a coolant gas extracts heat from the metallic conductors 152 is illustrated in FIG. 7. As further illustrated in FIG. 7, an end conductor 152' can be formed with a longitudinally extending terminal rod 160 so as to adapt the thermoelectric nuclear fuel element 140 for connection with other such elements in a gas cooled reactor. Series thermoelectric power generation then occurs in the connected thermoelectric nuclear fuel elements 140 in a manner similar to that described previously for other embodiments of the invention.

Fuel elements 170 and 180 shown in FIGS. 8 and 9 respectively are similar to the fuel element 140 just described, but differ therefrom in that respective thermoelectric generating components 172 and 182 therefore comprise conventional thermoelectric bodies 174 and 176 or 184 and 186 of opposed semiconductive types with a layer 178 of metal clad fissile material disposed therebetween. Cladding 179 of the fissile layer 178 thus serves as a conductive hot junction for the thermoelectric bodies 174 and 176 or 184 and 186. In addition, cooling conductors 177 of the fuel element 170 differ from the cooling conductors 152 of the fuel element 140 in that the cooling portion 156 of the latter is not in any case provided in the former. In the case of the fuel element 180 (FIG. 9), cooling conductors 188 are each provided with a slot 190 to obtain additional cooling surface area. Additional cooling is provided by cylindrical flanges 196 and 198 on each cooling conductor 188. The overlapping character of the assemblage of the apposed flanges 196 and 198 afford an effective clading for each of the thermoelectric components 182. Successive cooling conductors 188 are then insulatively but closely spaced from each other by respective insulative layers 192 and an annular air gap 194 is provided between adjacent cooling conductors 188 and the enclosed thermoelectric component 182 so as to insulate the hot thermoelectric circuit junction 179 of the latter from the conductive material of the coolant conductors 188.

Several embodiments of the invention have been set forth in the preceding description only for the purposes of illustration. Accordingly, it is desired that the invention be not by the embodiments described, rather that it be accorded an interpretation consistent with the scope and spirit of its broad principles.

What is claimed is:

1. In a thermoelectric nuclear fuel element, the combination comprising a plurality of pairs of dissimilar thermoelectric members, said members being generally of wafer configuration and being disposed in axially spaced relation in an alternating array, fissile means coupled to at least one member of each of said pairs, conductive means disposed between the members of each of said pairs and electrically joining the members of each pair to form thermoelectric hot junctions therebetween, and a number of discoidal conductors disposed respectively between adjacent pairs of said members, said conductors respectively joining an adjacent member of a juxtaposed pair of members with a dissimilar member of another juxtaposed pair of members to form thermoelectric cold junctions therebetween, said conductors extending radially outwardly of the perimeters of said members in order to dissipate heat to the ambient.

2. The combination of claim 1 in which said fissile means comprises at least one of the members of each of said pairs being fabricated from a fissile material.

3. The combination according to claim 1 wherein said fissile means is a mass of fissile material disposed generally between the members of each of said pairs and said hot junction conductive means is an electrically conductive cladding material surrounding said fissile masses and electrically connecting adjacent ones of said members.

4. A thermoelectric nuclear fuel element comprising positive and negative groups of annular thermoelectric members disposed in axial alignment, said positive and negative members being arranged in an alternating array, at least one of said groups being fabricated from a fissile material, a number of rod-like conductors fabricated from an electrically conductive material closely fitted within said array and in spaced tandem relation, said rod-like members electrically joining pairs of adjacent dissimilar ones of said members to form thermoelectric hot junctions therebetween, an insulating disc disposed in the space between each adjacent pair of said rod-like conductors and the associated ones of said dissimilar pairs, a plurality of tubular conductive segments disposed outwardly of said array and closely fitted thereover, said tubular segments being spaced along the length of said array and being offset from said rod-like connectors respectively so as to join a member of each dissimilar pair with a dissimilar member of an adjacent one of said pairs in order to provide cold thermoelectric junctions along said array, a number of insulating washers disposed respectively in the spaces among said tubular segments and between the members of each of said dissimilar pairs, a tubular insulating sleeve receiving each of said segments therein, and a tubular cladding member surrounding said sleeve and mounted in insulating relationship with each of said segments and each of said connectors.

5. In a thermoelectric nuclear fuel element, the combination comprising a plurality of pairs of dissimilar thermoelectric members, said members being generally of wafer configuration and being disposed in axially spaced relation in an alternating array, fissile means coupled to at least one member of each of said pairs, conductive means disposed between the members of each of said pairs and electrically joining the members of each pair to form thermoelectric hot junctions therebetween, and a number of discoidal conductors disposed respectively between adjacent pairs of said members, said conductors respectively joining an adjacent member of a juxtaposed pair of members with a dissimilar member of another juxtaposed pair of members to form thermoelectric cold junctions therebetween, said conductors having at least one slot formed therein in order to increase the heat transfer surfaces thereof.

6. In a thermoelectric nuclear fuel element, the combination comprising a plurality of pairs of dissimilar thermoelectric members, said members being generally of wafer configuration and being disposed in axially spaced relation in an alternating array, fissile means coupled to at least one member of each of said pairs, conductive means disposed between the members of each of said pairs and electrically joining the members of each pair to form thermoelectric hot junctions therebetween, and a number of discoidal conductors disposed respectively between adjacent pairs of said members, said conductors respectively joining an adjacent member of a juxtaposed pair of members with a dissimilar member of another juxtaposed pair of members to form thermoelectric cold junctions therebetween, said conductors being slotted to increase the heat transfer surfaces thereof, and apposed cylindrical flanges formed respectively on the outer surfaces of the adjacent conductors to further increase said heat transfer surfaces, said apposed flanges being lapped and closely fitted to provide an effective cladding for each pair of said members and for the associated fissile means.

References Cited by the Examiner

UNITED STATES PATENTS

| | | | |
|---|---|---|---|
| 2,902,423 | 9/59 | Luebke et al. | 176—12 |
| 2,976,426 | 3/61 | Rappaport | 310—3 |
| 2,976,433 | 3/61 | Rappaport et al. | 310—3 |
| 3,005,766 | 10/61 | Bartnoff | 136—4 |
| 3,008,890 | 11/61 | Bartnoff | 136—4 |
| 3,054,840 | 9/62 | Alsing | 136—4 |
| 3,117,913 | 1/64 | Shoupp | 136—4 X |

OTHER REFERENCES

AEC Document TID–7546, Book 2, pp. 484 and 485, November 1957.

Nuclear Science Abstracts, vol. 13, April-May 1959, Abstract No. 7768, page 1047 (QC77ON96).

Shoupp: German Application No. 1,083,446, June 1960.

CARL D. QUARFORTH, *Primary Examiner.*

REUBEN EPSTEIN, *Examiner.*